United States Patent
Duan et al.

(10) Patent No.: US 11,912,872 B1
(45) Date of Patent: Feb. 27, 2024

(54) LIGHT, THIN, WARM-KEEPING AND TEMPERATURE-ADJUSTING MODIFIED POLYMER AEROGEL COMPOSITE MATERIAL AND PREPARATION METHOD THEREOF

(71) Applicant: Sycoretc CAS Co., Ltd., Beijing (CN)

(72) Inventors: Yujing Duan, Beijing (CN); Sining Mao, Beijing (CN); Qingsheng Zhao, Beijing (CN)

(73) Assignee: SYCORETO CAS CO., LTD., Beijing (CN)

( * ) Notice: Subject to any disclaimer, the term of this patent is extended or adjusted under 35 U.S.C. 154(b) by 0 days.

(21) Appl. No.: 18/133,541

(22) Filed: Apr. 12, 2023

(30) Foreign Application Priority Data

Oct. 24, 2022 (CN) .......................... 202211299537.3

(51) Int. Cl.
*C08L 9/02* (2006.01)
*C08J 9/10* (2006.01)

(52) U.S. Cl.
CPC ................ *C08L 9/02* (2013.01); *C08J 9/103* (2013.01); *C08J 2203/04* (2013.01); *C08J 2309/02* (2013.01); *C08J 2477/06* (2013.01)

(58) Field of Classification Search
None
See application file for complete search history.

(56) References Cited

U.S. PATENT DOCUMENTS 5,369,137 A * 11/1994 Paquet ..................... C08J 9/127
521/146

FOREIGN PATENT DOCUMENTS

| CN | 107201026 A | * | 9/2017 | ............. B29C 69/00 |
|----|-------------|---|--------|-------------------------|
| CN | 107201026 A |   | 9/2017 |                         |
| CN | 111196887 A |   | 5/2020 |                         |
| CN | 111471251 A | * | 7/2020 |                         |
| CN | 111471251 A |   | 7/2020 |                         |

OTHER PUBLICATIONS

Zhang, Polyamide/Nitrile Rubber Blended Elastomer Mircoporous Foam Material, Sep. 26, 2017, machine translation of CN 107201026 (Year: 2017).*
Yan, Aerogel Containing Thermal Insulation Material, Jul. 31, 2020, machine translation of CN 111471251 (Year: 2020).*

* cited by examiner

*Primary Examiner* — Chinessa T. Golden
(74) *Attorney, Agent, or Firm* — Bayramoglu Law Offices LLC

(57) ABSTRACT

A lightweight, thermal insulation and temperature-adjusting modified polymer aerogel composite material and a preparation method thereof are provided. The composite material includes a heat insulation matrix with a topological and closed-cell foaming structure; And an enhanced thermal insulation low thermal conductivity element embedded in the bubble wall of the thermal insulation matrix, i.e. the non-porous part. Due to the special foaming process, the aerogel phase change thermal insulation composite material has a tiny closed-cell structure similar to that of aerogel materials, and aerogel particles and phase change microcapsules are added, so that the internal cell structure and porosity are further improved, and the aerogel phase change thermal insulation composite material has a certain phase change temperature regulation function and excellent thermal insulation performance.

12 Claims, 3 Drawing Sheets

LIGHT, THIN, WARM-KEEPING AND TEMPERATURE-ADJUSTING MODIFIED POLYMER AEROGEL COMPOSITE MATERIAL AND PREPARATION METHOD THEREOF

CROSS REFERENCE TO THE RELATED APPLICATIONS

This application is based upon and claims priority to Chinese Patent Application No. 202211299537.3, filed on Oct. 24, 2022, the entire contents of which are incorporated herein by reference.

TECHNICAL FIELD

The present invention belongs to the field of composite materials, and relates to a light, thin, thermal insulation and temperature-adjusting modified polymer aerogel composite material and a preparation method thereof.

BACKGROUND

Macroscopically speaking, the essence of heat is the external manifestation of the random movement of a large number of molecules. The hotter an object is, in fact, the more intense the molecular movement of this object is. This movement is manifested in the free movement of gas molecules in gas, in the mass flow of liquid molecules in liquid and in the vibration of solid molecules at a certain position in solid. To sum up, there are three ways of heat conduction, namely, heat conduction, convection heat conduction and radiation heat conduction. Heat conduction is caused by the mutual influence of thermal vibration of object molecules, and its trend is to make the heat of the whole object uniform everywhere. Convective heat conduction is caused by the relatively low density of hot gas or liquid and the relative flow of hot and cold liquid under the action of gravity. Radiant heat conduction is the way that all objects with temperatures higher than absolute zero conduct heat in the form of electromagnetic waves.

In order to achieve good thermal insulation effect, thermal insulation materials must restrain the above three ways of heat conduction. Regardless of the ever-changing preparation methods, the thermal insulation physics of various materials are these three.

Porous polymer material is a multiphase material composed of solid phase and a large number of cells. A bimodal cell structure means that there are two peaks on the cell size distribution curve of porous polymer materials. Porous polymer materials with a bimodal cell structure have bimodal cell size distribution, which makes them have good barrier performance, excellent absorption and penetration performance, and can meet the application of special filtration, sound absorption and padding. The unique structure of these materials has also attracted the attention of biomedical engineering. However, there are a large number of open-cell materials in the literature, and there are few reports about the above bimodal cell structure.

Foaming materials are mainly divided into soft foaming materials and hard foaming materials. Soft foaming materials are light in weight and good in softness, and have the functions of cushioning, sound absorption, shock absorption, heat preservation and filtration, and are widely used in industries such as electronics, home appliances, automobiles, sports and leisure. Hard foaming materials have the same low density as soft foaming materials, but they have high strength, so they are suitable for high-end fields that require light materials and high strength, and are mainly used in wind power generation, rail transit, yachts, aerospace, building energy conservation and other industries.

Cotton flocs, down and other flocs are mainly used as thermal insulation materials for clothing. In order to achieve a high thermal insulation effect, it is necessary to increase the thickness of the flocs and restrain the convection, which leads to the fluffy thermal insulation clothing, which in turn leads to the wearer's bloated appearance and even inconvenient movement, thus limiting the further improvement of the thermal insulation performance of the clothing. In recent years, with the improvement of textile technology, people have higher and higher requirements for thermal insulation clothing. They all hope that thermal insulation clothing materials are not only excellent in warmth, light and flexible, but also can buffer the influence of external temperature changes on the human body.

In nature, the state of matter generally exists in solid state, liquid state and gas state, and each state of matter can be called a "phase state". When a substance exchanges heat with the external environment and reaches a certain "special temperature point", its physical state will change from one phase to another. This phase change is called "phase change", and the special temperature point during phase change is "phase change temperature". Materials that can undergo phase change are called "Phase Change Materials".

The stored or released energy is also called "latent heat of phase change" during the two phase changes of an object from solid to liquid. When the physical state changes, the temperature of the material itself remains almost unchanged until the phase change is completed, forming a wide temperature platform. Although the temperature remains unchanged, the latent heat absorbed or released is quite large.

Compared with other energy storage methods (such as obvious energy storage), phase change heat storage materials have the following characteristics: the heat storage density per unit mass (volume) of phase change materials is large; the phase change process is kept at a constant temperature; Good chemical stability; High security. These advantages also play a potential role in the application and popularization of phase change materials.

A phase change material is a kind of functional material which can use natural energy for energy storage and temperature control.

Using polymer polymerization technology to make phase change materials into micro or nano capsules not only improves the heat conduction speed, but also prevents leakage. Especially microcapsule technology, it is one of the research hotspots. At present, most of the research on microencapsulated phase change materials focuses on its preparation method, selection of capsule core and capsule wall and cost control.

Because the phase change fiber has the function of intelligent temperature adjustment, when the external temperature changes sharply, the phase change microcapsules in the fiber will undergo solid-liquid or solid-solid phase change to release or store heat, thus buffering the influence of the external temperature change on the human body, thus creating a comfortable microclimate environment for the human body. Therefore, the phase change fiber has great application potential in the field of clothing warmth preservation.

At present, in a method of using phase change fibers to make clothing thermal insulation materials, phase change fibers and ordinary fibers are mixed and carded, laid and needled to obtain thermal insulation flocs. However, the thermal insulation flocs made of phase change fibers and ordinary fibers has the following problems: the phase change microcapsules on the surface of phase change fibers are easy to fall off during production and use, which greatly reduces the intelligent temperature regulation function of thermal insulation flocs; moreover, the air permeability and softness of this kind of thermal insulation flocs are relatively poor, which greatly reduces the wearing comfort of thermal clothing.

Aerogel is the lightest solid form in the world, and it is also the lowest density solid in the world, and the density can be 3 kilograms per cubic meter. Aerogel is a combination word, where aero is an adjective, indicating flying, and gel is obviously gel. Literally means gel that can fly. Any substance gel can be called aerogel as long as it can be dried to remove the internal solvent, and its shape can remain basically unchanged, and the product has high porosity and low density. Aerogels can be divided into inorganic aerogels, organic aerogels, mixed gas gels and composite aerogels. The common aerogel is silicon aerogel, which was first made by American scientist Kistler in 1931 because of betting with his friends. Other common aerogels are carbon aerogels, and the newly developed aerogels are mainly graphene oxide aerogels, fullerene aerogels and fiber/silica aerogels.

SUMMARY

Based on the present situation of the prior art, the present invention provides a light, thin thermal insulation and temperature-adjusting modified polymer aerogel composite material and a preparation method thereof. The modified polymer aerogel composite material has multiple properties such as lightness, thinness, warmth retention, temperature adjustment and the like, and can be widely used in various fields such as clothing, shoes and hats, cold chain packaging, architecture, aerospace and the like.

Specifically, the present invention provides the following technical solution:

the present invention relates to a polyamide/NBR blended elastomer microporous foaming material, and the formula (parts by mass) of the foaming material is as follows:

40-80 parts of NBR, 20-60 parts of polyamide, 0-100 parts of a filler, 0-50 parts of a plasticizer, 0.5-4 parts of a vulcanizing agent, 0-5 parts of a vulcanization accelerator, 1-3 parts of an antioxidant, 2-10 parts of a foaming agent, 0.5-4 parts of an active agent and 1-4 parts of an anti-scorching agent;

the foaming material has a bimodal cell size distribution.

According to one embodiment of the present invention, the cell diameters of the bimodal cell size distribution are in a range of 2 μm to 50 μm and 50 μm to 250 μm, respectively.

The present invention further provides a preparation method of the polyamide/NBR blended elastomer microcellular foaming material, which includes the following steps:

1) mixing processing: setting the temperature of the internal mixer above 60° C., firstly adding polyamide, adding NBR into the internal mixer after the polyamide is melted, then adding or not adding a filler, adding or not adding a plasticizer and adding an antioxidant in turn; mixing for the first time, then setting the temperature of an open mill below 60° C., adding a vulcanizing agent, adding or not adding a vulcanizing accelerator, adding or not adding a foaming agent, adding or not adding an active agent; mixing for the second time, discharging to obtain a rubber compound;

2) obtaining a microcellular foaming material with a bimodal cell size distribution and a topological and closed-cell foaming structure by a two-stage curing method: putting the rubber compound into an extruder, and extruding the required shape; putting the molded rubber compound into a molding machine at a temperature above 120° C. for primary curing; then raising the temperature to above 150° C. for secondary curing, and then preparing the microcellular foaming material with a bimodal cell size distribution and a topological and closed-cell foaming structure by a rapid cooling method.

According to one embodiment of the present invention, in step 1), the first mixing time is 5-7 min; the second mixing time is 3 min-5 min; the first mixing temperature is 60° C.-90° C.; the second mixing temperature is 40° C.-50° C.

According to one embodiment of the present invention, in step 2), the first curing pressure is 7 MPa to 20 MPa, the first curing temperature is 120° C. to 180° C., and the first curing time is 5 min to 30 min; the second curing pressure is 8 MPa-25 MPa, the second curing temperature is 150° C.-190° C., and the second curing time is 5 min-30 min.

According to an embodiment of the present invention, in step 2), the cooling rate of rapid cooling is greater than 4° C./s.

The present invention further provides use of the polyamide/NBR blended elastomer microporous foaming material in preparation of a thermal insulation material.

The present invention provides a modified polymer aerogel composite material, which includes:

a heat insulation matrix which has a topological and closed-cell foaming structure; and an element with enhanced thermal insulation and low thermal conductivity which is embedded in the bubble wall of the thermal insulation matrix.

According to one embodiment of the present invention, the element with enhanced thermal insulation and low thermal conductivity is selected from aerogels.

According to one embodiment of the present invention, the mass percentage content of the thermal insulation-strengthening low thermal conductivity element in the composite material is 2 wt %-15 wt %.

According to an embodiment of the present invention, the composite material further includes phase change microcapsules which are located in closed cells of the heat insulation matrix; in the composite material, the mass percentage content of the phase change microcapsules is 5-25 wt %.

According to one embodiment of the present invention, the material of the heat insulation matrix is an elastomer polymer foaming porous material or the polyamide/NBR blended elastomer microporous foaming material.

The present invention further provides a preparation method of the modified polymer aerogel composite material, which includes the following steps:

mixing a material forming a heat insulation matrix with an element with enhanced thermal insulation and low thermal conductivity, adding or not adding phase change microcapsules, adding or not adding other additives, foaming, and cooling to obtain the modified polymer aerogel composite material.

As mentioned above, the present invention further provides use of the modified polymer aerogel composite material in the fields of clothing, shoes and hats, cold chain packaging, architecture and aerospace.

The present invention provides a product including the above modified polymer aerogel composite material.

According to one embodiment of the present invention, the product is a composite phase-change thermal insulation material, a phase-change thermal insulation flocs capsule, a temperature-adjusting phase-change thermal insulation membrane or a thermal insulation membrane.

Compared with the prior art, the present invention has the following beneficial effects.

1. A polyamide/NBR blended elastomer microcellular foaming material is introduced into the modified polymer aerogel composite material of the present invention. The foaming material is a high-performance elastomer material with microcellular structure, and has self-reinforcing characteristics, good aging resistance and flame retardancy, as well as good toughness, tear strength and cushioning performance, and has many advantages such as light weight, insulation, weather resistance, flame retardancy, low water absorption, high and low temperature resistance, non-toxicity and environmental protection.

2. The modified polymer aerogel composite material of the present invention is wherein the an element with enhanced thermal insulation and low thermal conductivity (such as aerogel) and phase-change microcapsules are added to the elastomer microporous foaming material, which reduces the thermal conductivity and heat storage capacity, so that the composite material can be widely used in various fields such as clothing, shoes and hats, cold chain packaging, architecture, aerospace and the like. Specifically, the composite material is a modified polymer aerogel composite with a 3D multi-layered complex structure, and its 3D porous topological network skeleton has a thin-walled structure, which effectively reduces solid heat conduction and greatly limits gas heat conduction and heat convection. The shading effect of the modified polymer aerogel composite material also greatly reduces the radiation heat transfer at room temperature. With such a structure, the composite material of the present invention has extremely low thermal conductivity, and becomes a brand-new subversive scientific and technological material for keeping thermal insulation in winter in the field of textiles, shoes and clothing in the future with its excellent super-flexibility, light drape and excellent windproof and warmth retention. The composite material of the present invention not only has the characteristics of excellent warmth retention, overall lightness, softness, moisture conductivity and quick drying, but also avoids the problem that the phase change microcapsules in the existing thermal insulation flocs are easy to fall off, thus effectively ensuring the intelligent temperature adjustment function of the phase change thermal diaphragm.

3. The present invention provides a preparation method of the composite material. The composite material provided by the present invention is prepared by a specific two-stage process, and is a modified polymer aerogel composite with a 3D multi-level complex structure. Its three-dimensional porous topological network skeleton (as shown in FIG. 2) has a thin-walled structure, which effectively reduces the solid heat conduction and greatly limits the gas heat conduction and heat convection. The shading effect of the material also greatly reduces the radiation heat transfer at room temperature. With such a structure, the composite material of the present invention has extremely low thermal conductivity, and becomes a brand-new subversive scientific and technological material for keeping thermal insulation in winter in the field of textiles, shoes and clothing in the future with its excellent super-flexibility, light drape and excellent windproof and warmth retention.

DETAILED DESCRIPTION OF THE EMBODIMENTS

[Polyamide/NBR Blended Elastomer Microcellular Foaming Material]

Figure 1:
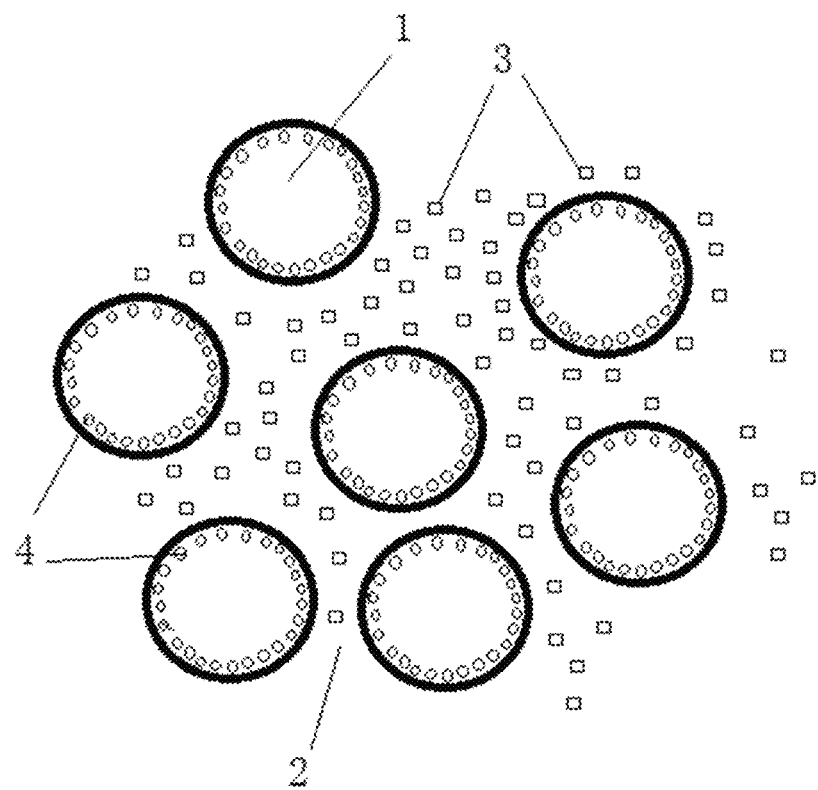
FIG. 1 is a schematic diagram of the cross-sectional structure of the modified polymer aerogel composite material of the present invention, wherein, 1 is a closed cell, 2 is a matrix, 3 is an element with enhanced thermal insulation and low thermal conductivity, and 4 is a phase change microcapsule.

As mentioned above, the present invention provides a polyamide/NBR blended elastomer microporous foaming material, which can be used for the elastic matrix of the composite material, and the formula (parts by mass) of the foaming material is as follows:

40-80 parts of NBR, 20-60 parts of polyamide, 0-100 parts of a filler, 0-50 parts of a plasticizer, 0.5-4 parts of a vulcanizing agent, 0-5 parts of a vulcanizing accelerator, 1-3 parts of an antioxidant and 1-4 parts of a scorching inhibitor;

The foaming material has a bimodal cell size distribution.

According to one embodiment of the present invention, the foaming material is a three-dimensional porous foaming material with a topological closed-cell foamed structure.

According to one embodiment of the present invention, the cell diameters of the bimodal cell size distribution are in the range of 2 μm to 50 μm and 50 μm to 250 μm, respectively.

According to one embodiment of the present invention, the number of cells in the range of 2 μm to 50 μm accounts for more than 50%, and the number of cells in the range of 50 μm to 250 μm accounts for less than 50%.

Nitrile butadiene rubber (NBR) is made from butadiene and acrylonitrile by emulsion polymerization. It has the characteristics of excellent oil resistance, high wear resistance, good heat resistance and strong adhesion. NBR is mainly used to make oil-resistant rubber products, which can be used in air at 120° C. or oil at 150° C. for a long time. In addition, it also has good water resistance, air tightness and excellent bonding performance. It is widely used to prepare various oil-resistant rubber products, various oil-resistant gaskets, gaskets, sleeves, flexible packaging, soft hoses, printing and dyeing cots, cable rubber materials, etc., and has become an essential elastic material in the industries of automobiles, aviation, petroleum, and copying.

Polyamide (PA), commonly known as nylon, is a general term for polymers containing amide groups in the repeating units of the main chain of macromolecules. Polyamide can be prepared by ring-opening polymerization of internal acid amine, or by polycondensation of diamine and diacid. Polyamide has good comprehensive properties, including mechanical properties, heat resistance, wear resistance, chemical resistance and self-lubrication, and has low friction coefficient, certain flame retardancy and easy processing. It is suitable for being filled and modified with glass fiber and other fillers, which can improve performance and expand application scope.

According to the present invention, NBR and polyamide are compounded, and a polyamide/NBR blended elastomer microcellular foaming material with special bimodal cell size distribution is prepared, which has the characteristics of self-reinforcement, good aging resistance and flame retardancy, good toughness, tear strength and buffering performance, and has many advantages of light weight, insulation, weather resistance, flame retardancy, low water absorption, high and low temperature resistance, non-toxicity, environmental protection and the like.

According to one embodiment of the present invention, the NBR is selected from but not limited to one or more of ordinary NBR, hydrogenated NBR, carboxyl NBR and the like.

According to one embodiment of the present invention, the polyamide is selected from but not limited to one or more of terpolymer nylon, long carbon chain nylon and the like.

According to one embodiment of the present invention, the filler is selected from but not limited to one or more of carbon black, white carbon black, calcium carbonate, short fiber and the like.

According to one embodiment of the present invention, the plasticizer is selected from but not limited to one or more of paraffin oil, naphthenic oil, dioctyl phthalate and the like.

According to one embodiment of the present invention, the vulcanizing agent is selected from but not limited to one or more of sulfur, DCP and the like.

According to one embodiment of the present invention, the vulcanization accelerator is selected from but not limited to one or more of D, DM, TMTD, TAIC, CBS and the like.

According to one embodiment of the present invention, the antioxidant is selected from but not limited to one or more of TK100, N-phenyl-N'-cyclohexyl p-phenylenediamine (4010), 4020 and the like.

According to one embodiment of the present invention, the anti-scorching agent is selected from but not limited to N-cyclohexyl thiotitanate imide (CTP).

According to one embodiment of the present invention, the formula further comprises a foaming agent and an active agent, wherein the foaming agent is 2-10 parts by mass and the active agent is 0.5-4 parts by mass.

According to one embodiment of the present invention, the foaming agent is selected from but not limited to one or more of azodicarbonamide (AC), 4,4'-oxydibenzenesulfonyl hydrazide (OBSH) and the like.

According to one embodiment of the present invention, the active agent is selected from, but not limited to, zinc oxide.

[Preparation of Polyamide/NBR Blended Elastomer Microcellular Foaming Material]

As mentioned above, the present invention further provides a preparation method of the polyamide/NBR blended elastomer microcellular foaming material, which comprises the following steps:

1) mixing processing: setting the temperature of the internal mixer above 60° C., firstly adding polyamide, adding NBR into the internal mixer after the polyamide is melted, then adding or not adding a filler, adding or not adding a plasticizer and adding an antioxidant in turn; mixing for the first time, then setting the temperature of an open mill below 60° C., adding a vulcanizing agent, adding or not adding a vulcanizing accelerator, adding or not adding a foaming agent, adding or not adding an active agent; mixing for the second time, discharging to obtain a rubber compound;

2) obtaining a microcellular foaming material with a bimodal cell size distribution and a topological and closed-cell foaming structure by a two-stage curing method: putting the rubber compound into an extruder, and extruding the required shape; putting the molded rubber compound into a molding machine at a temperature above 120° C. for primary curing; then raising the temperature to above 150° C. for secondary curing, and then preparing the microcellular foaming material with a bimodal cell size distribution and a topological and closed-cell foaming structure by a rapid cooling method.

According to one embodiment of the present invention, the preparation method further comprises the following steps:

3) shaping, deodorizing and softening: shaping, deodorizing and softening the microporous foaming material obtained in step 2).

According to one embodiment of the present invention, in step 1), the first mixing time is 4 min-7 min; the second mixing time is 3 min-5 min.

According to one embodiment of the present invention, in step 1), the first mixing temperature is 60-90° C.; the second mixing temperature is 40° C.-50° C.

According to one embodiment of the present invention, in step 2), a plate, a tube or other desired shape is extruded.

According to one embodiment of the present invention, in step 2), the first curing pressure is 7 MPa to 20 MPa, the first curing temperature is 120° C. to 180° C., and the first curing time is 5 min to 30 min.

According to one embodiment of the present invention, the material cured for the first time is initially foamed, and it needs to be continuously treated under the conditions of elevated temperature and pressure so that the phase change microcapsules are precipitated and attached to the inner wall of the closed cells of the thermal insulation matrix, so as to maintain the integrity of the closed cells of the thermal insulation matrix, and the pre-solidified sample is cured for the second time; When the foaming process reaches equilibrium, the mold is opened after rapid cooling (the cooling rate is better than 4° C./s), and the sample is taken out to obtain the microporous composite with a bimodal cell size distribution.

According to one embodiment of the present invention, in step 2), the pressure for the second curing is 8 MPa to 25 MPa, the temperature for the second curing is 150° C. to 190° C., and the time for the second curing is 5 min to 30 min.

According to an embodiment of the present invention, in step 2), the cooling rate of rapid cooling is greater than 4'C/s.

According to one embodiment of the present invention, in step 3), the shaping, deodorizing and softening is vulcanization at 140-180° C. for 10-60 min, and the vulcanization mode is hot air vulcanization, microwave radiation crosslinking or infrared radiation crosslinking.

[Use of Polyamide/NBR Blended Elastomer Microcellular Foaming Material]

As mentioned above, the present invention further provides use of the polyamide/NBR blended elastomer microcellular foaming material in preparation of a thermal insulation material.

[Modified Polymer Aerogel Composites]

As mentioned above, the present invention provides a modified polymer aerogel composite material, which includes:

a heat insulation matrix having a topological, closed-cell foaming structure; and an element with enhanced thermal insulation and low thermal conductivity, which is embedded in the bubble wall of the thermal insulation matrix.

According to one embodiment of the present invention, the bubble wall of the thermal insulation matrix refers to the part of the thermal insulation matrix that forms the topological closed-cell foaming structure, and in essence, the bubble wall of the thermal insulation matrix is the non-porous part of the thermal insulation matrix.

According to an embodiment of the present invention, the element with enhanced thermal insulation and low thermal conductivity can be selected from aerogels, such as inorganic aerogel nanoparticles or organic aerogels.

Specifically, the inorganic aerogel nanoparticles can be selected from one or more of alumina nanoparticles, zirconia nanoparticles, silica nanoparticles, magnesium fluoride nanoparticles, calcium fluoride nanoparticles, silicon carbide nanoparticles, boron carbide nanoparticles, boron nitride nanoparticles, titanium nitride nanoparticles, titanium dioxide-silica nanoparticles, vanadium oxide-titanium dioxide nanoparticles and titanium oxide nanoparticles.

Specifically, the organic aerogels can be selected from one or more of resorcinol-formaldehyde aerogels, melamine-formaldehyde aerogels, urethane aerogels, polyimide aerogels, polymethylmethacrylate aerogels, polystyrene aerogels, polydicyclopentadiene aerogels, carbon nanotubes and the like.

According to an embodiment of the present invention, the aerogel can be a solid powder with a three-dimensional network microstructure with at least one dimension (preferably at least two or three dimensions) between 5 nm-100 nm.

According to one embodiment of the present invention, the aerogel can be in the form of particles or short fibers.

In the present invention, the thermal conductivity of the solid (such as the thermal insulation matrix) is further reduced and the heat conduction path is reduced by the element with enhanced thermal insulation and low thermal conductivity (such as aerogel, specifically inorganic aerogel nanoparticles or organic aerogel) embedded in the bubble wall of the thermal insulation matrix, and the modified polymer aerogel composite material with thermal insulation is obtained.

According to one embodiment of the present invention, in the composite material, the mass percentage content of the thermal insulation-strengthening low thermal conductivity element is 2%-15 wt %, such as 2%, 3 wt %, 4 wt %, 5%, 6 wt %, 7 wt %, 8 wt %, 9 wt %, 10 wt %, 11 wt %, 12 wt %, 13 wt %, 14 wt % or 15 wt %.

According to an embodiment of the present invention, the composite material further includes phase change microcapsules, and the phase change microcapsules are located in closed cells of the heat insulation matrix.

According to one embodiment of the present invention, the phase change microcapsules are located on the inner wall of the closed cell of the heat insulation matrix.

In the present invention, the phase change microcapsules are further synthesized into the closed cells of the heat insulation matrix (specifically located on the inner wall of the closed cells of the heat insulation matrix), so as to store energy, absorb and release heat, generate temperature regulation, and form a micro air conditioning environment.

According to one embodiment of the present invention, the phase change microcapsule is a solid-liquid phase change microcapsule which changes phase at 15-35 C, and can be adjusted according to design requirements. Illustratively, paraffin can be included in the phase change microcapsule, and further exemplarily, the phase change microcapsule is selected from urea-formaldehyde resin-paraffin phase change microcapsule and the like.

According to one embodiment of the present invention, the mass percentage content of phase change microcapsules in the composite material is 5%-25 wt %, such as 5%, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt % or 25 wt %.

According to one embodiment of the present invention, the material of the heat insulation matrix is an elastic polymer foaming porous material.

According to one embodiment of the present invention, the material of the heat insulation matrix is the polyamide/NBR blended elastomer microcellular foaming material.

For three-dimensional porous foaming materials, the thermal conductivity is mainly determined by the thermal conductivity of the gas in the closed cell (Knudsen effect) and the thermal conductivity of the solid in the bubble wall, while radiation and convection are basically ignored. According to the present invention, the solid thermal conductivity in the bubble wall is reduced by embedding elements with enhanced thermal insulation and low thermal conductivity; in addition, the heat storage effect of phase change microcapsules is utilized to adjust the local temperature microcirculation; and then, the nucleation and growth of microbubbles are controlled to obtain a heat insulation matrix with bimodal cell size distribution, thereby further reducing the gas thermal conductivity.

According to the present invention, the phase change microcapsules and the enhanced thermal insulation and low thermal conductivity elements (such as aerogels) are integrated in a polymer skeleton matrix (i.e., the thermal insulation matrix) to form a complete micro-nano nanocomposite material, thus effectively avoiding the defect that the phase change microcapsules and the element with enhanced thermal insulation and low thermal conductivity (such as aerogels) fall off during use.

According to an embodiment of the present invention, the composite material further includes a moisture permeable microstructure. In the present invention, the moisture permeable microstructure is obtained through a certain mechanical micromachining and punching treatment, so that the function of exhausting moisture is achieved.

Figure 2:
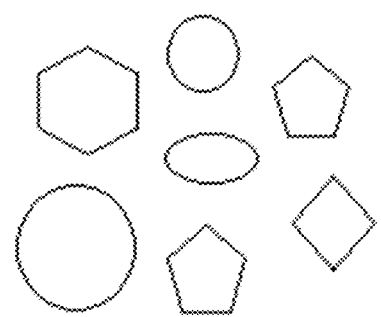
FIG. 2 is a schematic diagram of the topological structure of the modified polymer aerogel composite material of the present invention.
Figure 3:
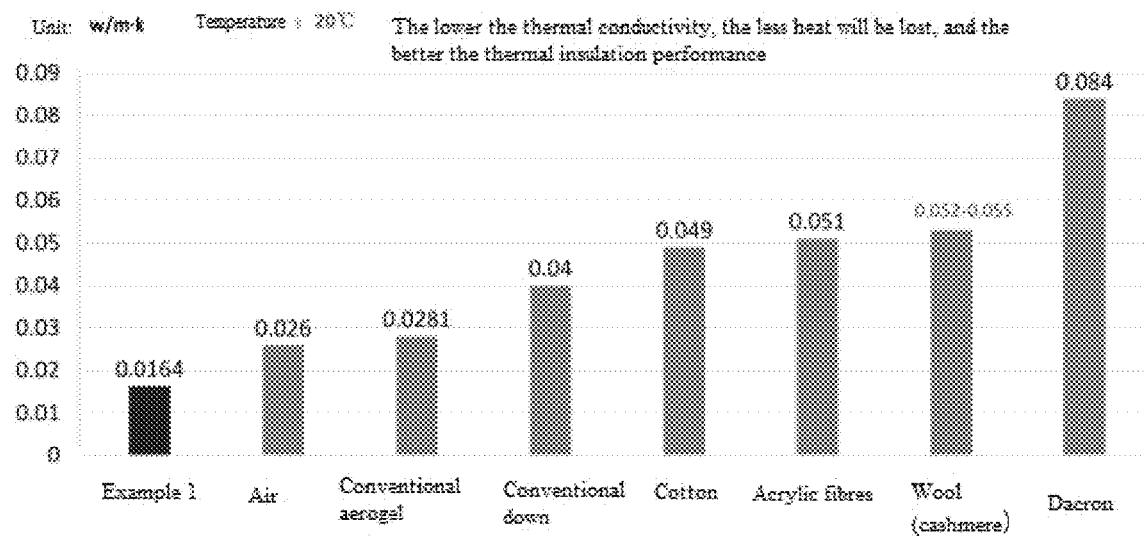
FIG. 3 is a comparison of thermal conductivity between the modified polymer aerogel composite prepared by the present invention and other typical thermal insulation materials for textile and garment.
Figure 4:
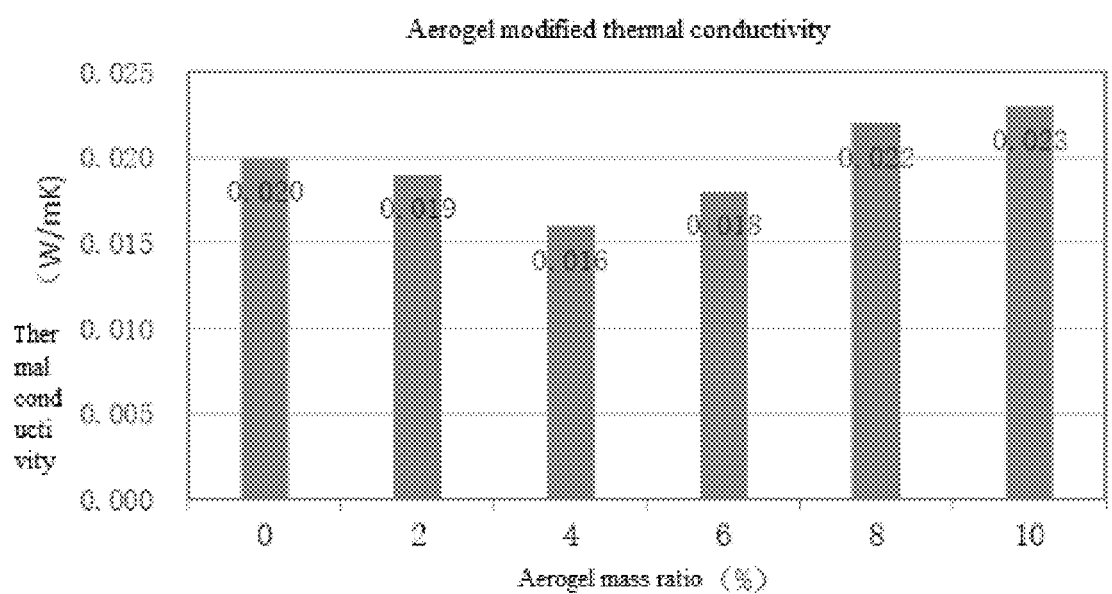
FIG. 4 is a graph showing the relationship between the mass ratio of aerogel in the modified polymer aerogel composite and the thermal conductivity of the modified polymer aerogel composite.
Figure 5:
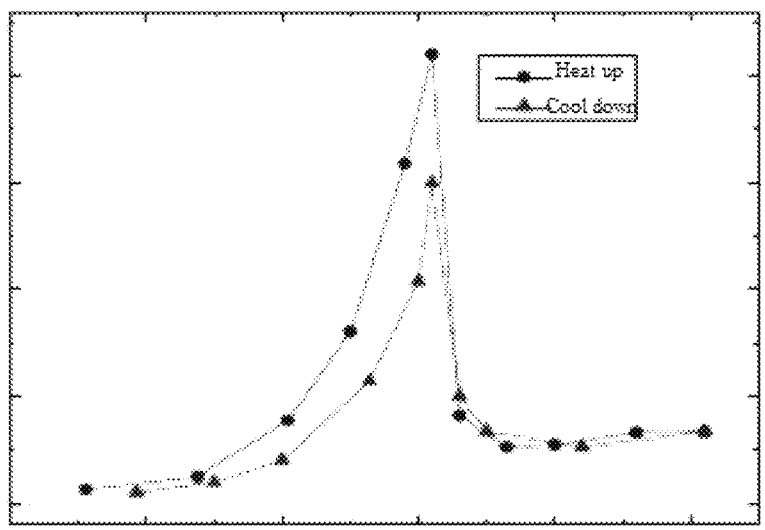
FIG. 5 is a DTA analysis diagram of the equivalent heat storage effect of the modified polymer aerogel composite material containing phase change microcapsules prepared by the present invention (heating endothermic cooling and cooling and exothermic heating).

The composite material of the present invention (also called Topological Flex gel) is a modified polymer aerogel composite prepared by using proprietary technology and an exclusive special process. The composite material has a 3D multi-level complex structure. As shown in FIG. 1, its three-dimensional porous topological network skeleton (as shown in FIG. 2) has a thin-walled structure, which effectively reduces the solid-state heat conduction, while the gas-condensed structure greatly limits the gas heat conduction and heat convection. At the same time, the material has shading effect, which greatly reduces the radiation heat transfer at room temperature. With this structure, the composite material has extremely low thermal conductivity, and with its excellent super-flexibility, light drape and excellent windproof and warmth retention, it will become a brand-new subversive scientific and technological material for winter warmth retention in the future textile field.

[Preparation Method of Modified Polymer Aerogel Composite Material]

As mentioned above, the present invention further provides a preparation method of the modified polymer aerogel composite material, which includes the following steps:

mixing a material forming a heat insulation matrix with an element with enhanced thermal insulation and low thermal conductivity, adding or not adding phase change microcapsules, adding or not adding other additives, foaming, and cooling to obtain the modified polymer aerogel composite material.

According to one embodiment of the present invention, secondary foaming is required in the method, so that the element with enhanced thermal insulation low thermal conductivity and the phase change microcapsule form the required structure.

Specifically, in the mixing processing step of the preparation method of the polyamide/NBR blended elastomer microcellular foaming material, an element with enhanced thermal insulation and low thermal conductivity is added, and phase change microcapsules are added or not, and then the modified polymer aerogel composite material of the present invention is obtained in a two-stage curing method. More specifically, during the second mixing of the mixing process, an element with enhanced thermal insulation and low thermal conductivity is added, and phase change microcapsules are added or not.

[Use of Modified Polymer Aerogel Composite Material]

As mentioned above, the present invention further provides use of the modified polymer aerogel composite material in various fields such as clothing, shoes and hats, cold chain packaging, architecture, aerospace and the like. Specifically, it can be used for: thermal insulation clothing, bedding, shoes, hats, gloves, multifunctional single-soldier sleeping bags, tents, cold chain packaging, building insulation (interior decoration), automobile insulation, new energy battery insulation devices, etc.

According to one embodiment of the present invention, the material is used for shoe materials, in particular for the thermal insulation layer of shoe materials. It can be compounded with other materials of shoes by hot melting or chemical fusion.

According to one embodiment of the present invention, the composite material can be compounded with various knitted and woven fabrics by a conventional hot melt lamination compounding method.

[Various Specific Uses of Modified Polymer Aerogel Composite Materials]

As mentioned above, the present invention provides a composite phase change thermal insulation material, which includes the modified polymer aerogel composite material.

According to one embodiment of the present invention, the composite phase change thermal insulation material is a composite phase change thermal insulation film material or a composite phase change thermal insulation body material.

According to one embodiment of the present invention, the area density of the composite phase change thermal insulation film is 30-100 $g/m^2$.

the present invention further provides a phase change thermal-insulation batting capsule, which comprises the modified polymer aerogel composite material. Specifically, it can also be wherein the phase change microcapsules are solid-liquid phase change microcapsules which undergo phase change at 15-35° C., the average particle size of the solid-liquid phase change microcapsules is 1-3 microns, the enthalpy retention rate is 20-99%, and the mass percentage content of the phase change microcapsules in the composite material is 10-15%.

the present invention further provides a temperature-adjusting phase-change thermal insulation membrane, which includes the modified polymer aerogel composite material. Specifically, it can also be wherein the mass percentage content of aerogel in the composite material is 5-15%. More specifically, the area density of the diaphragm is 30-100 $g/m^2$. More specifically, the thickness of the temperature-adjusting phase-change thermal insulation membrane is 0.3 mm-8 mm to 8 mm, and the pinhole density is 1 to 30 cells/$cm^2$, or it may not be perforated.

the present invention further provides a thermal diaphragm, which comprises the modified polymer aerogel composite material. The purpose is to provide a unique method to replace the current thermal insulation flocs and improve the micro-nano composite phase change and aerogel fusion.

In the following, the technical solution of the present invention will be further described in detail with specific examples. It should be understood that the following examples only illustrate and explain the present invention, and should not be construed as limiting the scope of protection of the present invention. All technologies realized based on the above contents of the present invention are covered in the scope that the present invention aims to protect.

Unless otherwise specified, the raw materials and reagents used in the following examples are all commercially available or can be prepared by known methods.

Example 1

The formula of the modified polymer aerogel composite material in the embodiment of the present invention is as follows:

100 parts by mass of polyamide/NBR blended elastomer microporous foaming material.
4 parts by mass of aerogel (polyimide aerogel)
10 parts by mass of phase change microcapsule (urea-formaldehyde resin-paraffin phase change microcapsule)
4 parts by mass of a foaming agent (AC).

The formula (parts by mass) of the polyamide/NBR blended elastomer microcellular foaming material is as follows:

70 parts of NBR (NBR);
60 parts of polyamide (PA);
10 parts of a foaming agent (AC);
2 parts of an active agent (zinc oxide);
20 parts of a filler (white carbon black);
10 parts of a plasticizer (paraffin oil);
3 portions of a vulcanizing agent (sulfur);
1 part of a vulcanization accelerator (TMTD);

2 parts of an antioxidant (N-phenyl-N'-cyclohexyl p-phenylenediamine);

1 part of an anti-scorching agent (N-(Cyclohexylthio) phtalimide (CTP)).

The preparation method of the composite material in this embodiment includes the following steps:

1) Preparation of a Rubber Compound (1) the temperature of the internal mixer was set at 80° C. and the rotating speed at 60 rpm; firstly PA was fed, then NBR was fed into the internal mixer after the PA was melted; plastination was carried out for 60 s, the ram was lifted, and an antioxidant was added and mixed for 90 s; the ram was lifted, a filler and a plasticizer were added and continuously mixed for 90 s; then the rubber was discharged to obtain the master rubber;

(2) the temperature of the mill roller was raised to 50° C., and the master rubber was into the open mill to be kneaded for 3-4 min; then a vulcanizing agent, a vulcanization accelerator, a foaming agent, an active agent, aerogel and phase change microcapsules were added, mixed, cooled to room temperature to stand for 24 hours.

2) First Curing

Molding pre-sulfurization: the rubber mixture was put into the mold, the hot press pressure was 9 MPa, the temperature was 140° C., and the pre-sulfurization time was 10 min; then the rubber compound was left in the mold to wait for the second curing.

3) Secondary Curing

The material cured for the first time was foamed initially, and it needed to be treated continuously under the conditions of elevated temperature and pressure so that the phase change microcapsules were precipitated and attached to the surface of the closed cells of the thermal insulation matrix, so as to maintain the integrity of the closed cells of the thermal insulation matrix. The temperature range of the pre-solidified sample for the second curing was 160° C. and the pressure was 15 MPa. When the foaming process reached equilibrium, the mold was quickly cooled (the cooling rate was preferably greater than 4° C./s), and the sample was taken out to obtain the bimodal cell size distribution.

The present invention adopts a unique two-step foaming process. The primary foaming (primary curing) affects the distribution of closed cells, foam walls and element with enhanced thermal insulation and low thermal conductivity, and the secondary foaming (secondary curing) controls the precipitation distribution of phase change microcapsules.

According to the phase change thermal insulation composite material and the preparation method thereof, the composite material prepared in this embodiment not only has the characteristics of excellent thermal insulation, overall lightness, softness, moisture conduction and quick drying, but also avoids the problem that the phase change microcapsules in the existing thermal insulation flocs are easy to fall off, thus effectively ensuring the intelligent temperature adjustment function of the phase change thermal insulation composite material.

The composite material prepared in this example not only has high thermal insulation, but also maintains excellent flexibility (see Table 1 and Table 2).

Table 1 Properties of Phase Change Thermal Insulation Composites

|  | Sample 1 |
| --- | --- |
| Density (g/cm$^3$) | 0.056 |
| Thermal conductivity (W/mK) | 0.016 |
| Hardness (Shore C) | 4 |
| Rebounding | 32% |

Table 2 Performance Comparison Between the Phase Change Thermal Insulation Composite of the Present Invention and the Existing Thermal Insulation Materials

| Sample | Thickness (mm) | CLO value | CLO value per unit thickness | Equivalent thermal conductivity coefficient |
| --- | --- | --- | --- | --- |
| Polyimide needle-punched floc | 13 | 2.32 | 0.18 | 36.14 |
| Ultrafine hollow polyester flocs | 25 | 3.74 | 0.15 | 43 |
| Thermal storage floc (hollow mixed far infrared fiber) | 15 | 2.13 | 0.14 | 45.45 |
| Example 1 | 1.50 | 3.81 | 2.54 | 2.535 |

Exemplary embodiments of the present invention have been described above. However, the protection scope of this application is not limited to the above-mentioned embodiments. Any modification, equivalent substitution, improvement, etc. made by a person skilled in the art within the spirit and principle of the present invention should be included in the protection scope of the present invention.

What is claimed is:

1. A polyamide/NBR blended elastomer microcellular foaming material, comprising the following components in parts by mass:

40-80 parts of NBR, 20-60 parts of polyamide, 0-100 parts of a filler, 0-50 parts of a plasticizer, 0.5-4 parts of a vulcanizing agent, 0-5 parts of a vulcanization accelerator, 1-3 parts of an antioxidant, 2-10 parts of a foaming agent, 0.5-4 parts of an active agent, and 1-4 parts of an anti-scorching agent;

wherein the polyamide/NBR blended elastomer microcellular foaming material has a bimodal cell size distribution;

the polyamide/NBR blended elastomer microcellular foaming material is prepared by the following method:

1) mixing processing: setting a temperature of an internal mixer above 60° C., firstly adding polyamide, adding NBR into the internal mixer after the polyamide is melted, then optionally adding a filler, optionally adding a plasticizer, and adding an antioxidant in turn; mixing for a first time, then setting a temperature of an open mill below 60° C., adding a vulcanizing agent, optionally adding a vulcanizing accelerator, optionally adding a foaming agent, optionally adding an active agent; mixing for a second time, discharging to obtain a rubber compound;

2) obtaining the polyamide/NBR blended elastomer microcellular foaming material with the bimodal cell size distribution and a topological and closed-cell foaming structure by a two-stage curing method: putting the rubber compound into an extruder, and extruding a required shape to obtain a molded rubber compound; putting the molded rubber compound into a molding machine at a temperature above 120° C. for a first curing; then raising the temperature to above 150° C. for a second curing, and then preparing the polyamide/NBR blended elastomer microcellular foaming material with the bimodal cell size distribution and the topological and closed-cell foaming structure by a rapid cooling method.

2. The polyamide/NBR blended elastomer microcellular foaming material according to claim 1, wherein a cell size of the bimodal cell size distribution is in a range of 2 μm to 50 μm and 50 μm to 250 μm, respectively.

3. A modified polymer aerogel composite material, comprising:
a heat insulation matrix having a topological and closed-cell foaming structure; and
an element with enhanced thermal insulation and low thermal conductivity embedded in a bubble wall of the thermal insulation matrix;
wherein a material of the heat insulation matrix is the polyamide/NBR blended elastomer microcellular foaming material according to claim 1.

4. The modified polymer aerogel composite material according to claim 3, wherein the element with enhanced thermal insulation and low thermal conductivity is selected from aerogel; in the modified polymer aerogel composite material, a mass percentage content of the element with enhanced thermal insulation and low thermal conductivity is 2 wt %-15 wt %.

5. The modified polymer aerogel composite material according to claim 3, wherein the modified polymer aerogel composite material further comprises phase change microcapsules, wherein the phase change microcapsules are located in closed cells of the heat insulation matrix; in the modified polymer aerogel composite material, a mass percentage content of the phase change microcapsules is 5-25 wt %.

6. A method of using the modified polymer aerogel composite material according to claim 3 in the fields of clothing, shoes and hats, cold chain packaging, architecture and aerospace.

7. The method of using according to claim 6, wherein the element with enhanced thermal insulation and low thermal conductivity is selected from aerogel; in the modified polymer aerogel composite material, a mass percentage content of the element with enhanced thermal insulation and low thermal conductivity is 2 wt %-15 wt %.

8. The method of using according to claim 6, wherein the modified polymer aerogel composite material further comprises phase change microcapsules, wherein the phase change microcapsules are located in closed cells of the heat insulation matrix; in the modified polymer aerogel composite material, a mass percentage content of the phase change microcapsules is 5-25 wt %.

9. A modified polymer aerogel composite material, comprising:
a heat insulation matrix having a topological and closed-cell foaming structure; and
an element with enhanced thermal insulation and low thermal conductivity embedded in a bubble wall of the thermal insulation matrix;
wherein the modified polymer aerogel composite material further comprises phase change microcapsules, wherein the phase change microcapsules are located in closed cells of the heat insulation matrix; in the modified polymer aerogel composite material, a mass percentage content of the phase change microcapsules is 5-25 wt % and
wherein a material of the heat insulation matrix is a polyamide/NBR blended elastomer microcellular foaming material comprising the following components in parts by mass:
40-80 parts of NBR, 20-60 parts of polyamide, 0-100 parts of a filler, 0-50 parts of a plasticizer, 0.5-4 parts of a vulcanizing agent, 0-5 parts of a vulcanization accelerator, 1-3 parts of an antioxidant, 2-10 parts of a foaming agent, 0.5-4 parts of an active agent, and 1-4 parts of an anti-scorching agent;
wherein the polyamide/NBR blended elastomer microcellular foaming material has a bimodal cell size distribution;
the polyamide/NBR blended elastomer microcellular foaming material is prepared by the following method:
1) mixing processing: setting a temperature of an internal mixer above 60° C., firstly adding polyamide, adding NBR into the internal mixer after the polyamide is melted, then optionally adding a filler, optionally adding a plasticizer, and adding an antioxidant in turn; mixing for a first time, then setting a temperature of an open mill below 60° C., adding a vulcanizing agent, optionally adding a vulcanizing accelerator, optionally adding a foaming agent, optionally adding an active agent; mixing for a second time, discharging to obtain a rubber compound;
2) obtaining the polyamide/NBR blended elastomer microcellular foaming material with the bimodal cell size distribution and a topological and closed-cell foaming structure by a two-stage curing method: putting the rubber compound into an extruder, and extruding a required shape to obtain a molded rubber compound; putting the molded rubber compound into a molding machine at a temperature above 120° C. for a first curing; then raising the temperature to above 150° C. for a second curing, and then preparing the polyamide/NBR blended elastomer microcellular foaming material with the bimodal cell size distribution and the topological and closed-cell foaming structure by a rapid cooling method.

10. A preparation method of the polyamide/NBR blended elastomer microcellular foaming material according to claim 1, comprising the following steps:
1) mixing processing: setting the temperature of the internal mixer above 60° C., firstly adding polyamide, adding NBR into the internal mixer after the polyamide is melted, then optionally adding the filler, optionally adding the plasticizer and adding the antioxidant in turn; mixing for the first time, then setting the temperature of the open mill below 60° C., adding the vulcanizing agent, optionally adding the vulcanizing accelerator, optionally adding the foaming agent, optionally adding the active agent; mixing for the second time, discharging to obtain the rubber compound;
2) obtaining the polyamide/NBR blended elastomer microcellular foaming material with the bimodal cell size distribution and the topological and closed-cell foaming structure by the two-stage curing method: putting the rubber compound into the extruder, and extruding the required shape to obtain the molded rubber compound; putting the molded rubber compound into the molding machine at the temperature above 120° C. for the first curing; then raising the temperature to above 150° C. for the second curing, and then preparing the polyamide/NBR blended elastomer microcellular foaming material with the bimodal cell size distribution and the topological and closed-cell foaming structure by the rapid cooling method.

11. The preparation method according to claim 10, wherein in step 1), a first mixing time is 5 min to 7 min; a second mixing time is 3 min-5 min; a first mixing temperature is 60° C.-90° C.; a second mixing temperature is 40° C.-50° C.;

and/or, in step 2), a first curing pressure is 7 MPa to 20 MPa, a first curing temperature is 120° C. to 180° C., and a first curing time is 5 min to 30 min; a second curing pressure is 8 MPa-25 MPa, a second curing temperature is 150° C.-190° C., and a second curing time is 5 min-30 min;

and/or, in step 2), a cooling rate of rapid cooling is greater than 4° C./s.

12. The preparation method according to claim 10, wherein a cell size of the bimodal cell size distribution is in a range of 2 µm to 50 µm and 50 µm to 250 µm, respectively.

* * * * *